(12) United States Patent
Dindi et al.

(10) Patent No.: US 6,733,692 B2
(45) Date of Patent: May 11, 2004

(54) RHODIUM FOAM CATALYST FOR THE PARTIAL OXIDATION OF HYDROCARBONS

(75) Inventors: Hasan Dindi, Wilmington, DE (US); William H. Manogue, Newark, DE (US); Theodore A. Koch, Wilmington, DE (US); Sourav Kumar Sengupta, Wilmington, DE (US)

(73) Assignee: ConocoPhillips Company, Houston, TX (US)

( * ) Notice: Subject to any disclaimer, the term of this patent is extended or adjusted under 35 U.S.C. 154(b) by 209 days.

(21) Appl. No.: 09/838,070

(22) Filed: Apr. 19, 2001

(65) Prior Publication Data

US 2002/0013227 A1 Jan. 31, 2002

Related U.S. Application Data

(60) Provisional application No. 60/199,066, filed on Apr. 20, 2000.

(51) Int. Cl.⁷ .............. C01B 3/00; C01B 31/18; C01B 3/26; B01J 23/40; B01J 23/46
(52) U.S. Cl. .......... 252/373; 423/418.2; 423/651; 502/325; 502/326
(58) Field of Search .......... 252/373; 423/418.2; 423/651; 502/325, 326

(56) References Cited

U.S. PATENT DOCUMENTS

| | | | | |
|---|---|---|---|---|
| 4,087,259 A | * | 5/1978 | Fujitani et al. | 48/212 |
| 5,510,056 A | | 4/1996 | Jacobs et al. | 252/373 |
| 5,639,401 A | | 6/1997 | Jacobs et al. | 252/373 |
| 5,648,582 A | | 7/1997 | Schmidt et al. | 585/652 |
| 5,654,491 A | | 8/1997 | Goetsch et al. | 568/469.9 |
| 5,883,138 A | | 3/1999 | Hershkowitz et al. | 518/703 |

FOREIGN PATENT DOCUMENTS

| | | | | |
|---|---|---|---|---|
| EP | 0 303 438 | 2/1989 | | C01B/3/38 |
| EP | 0 576 096 A2 | 12/1993 | | C01B/3/38 |
| EP | 0 640 559 A1 | 3/1995 | | C01B/3/38 |
| WO | WO 97/31738 | 9/1997 | | B22F/3/11 |
| WO | WO 99/35082 | 7/1999 | | C01B/3/38 |
| WO | WO 99/37580 | 7/1999 | | |

OTHER PUBLICATIONS

Z. Tian, et al; *The State of Rh During the Partial Oxidation of Methane Into Synthesis Gas*; Catalysis Letters 57 (1999); pp. 9–17.

K. H. Hofstad et al.; *Partial Oxidation of Methane Over Platinum Metal Gauze*; Catalysis Letters 36 (1996); pp. 25–30.

M. Fathi et al.; *Partial Oxidation of Methane to Synthesis Gas at Very Short Contact Times*; Catalysis Today (1998); pp. 205–209.

E. P. J. Mallens et al.; *The Reaction Mechanism of the Partial Oxidation of Methane to Synthesis gas: A Transient Kinetic Study Over Rhodium and a Comparison with Platinum*; Journal of Catalysis Letters 167 (1997); pp. 43–56.

Torniainen, P.M. et al; *Comparison of Monolith–Supported Metals for the Direct Oxidation of Methane to Syngas*; Journal of Catalysts, Academic Press, Duluth, MN.; vol. 146, 1988; (pp. 1–10).

International Search Report for International Application No. PCT/US01/12955 dated Nov. 9, 2001 (4 p.).

\* cited by examiner

*Primary Examiner*—Stanley S. Silverman
*Assistant Examiner*—Jonas N. Strickland
(74) *Attorney, Agent, or Firm*—Conley Rose, P.C.

(57) ABSTRACT

This invention provides a process for the catalytic partial oxidation of a hydrocarbon feedstock by contacting a feed stream including a hydrocarbon feedstock and an oxygen-containing gas with a catalyst in a reaction zone maintained at conversion-promoting conditions effective to produce an effluent stream including carbon monoxide and hydrogen. The process of this invention is characterized by using an unsupported porous catalyst containing rhodium, such as rhodium foam.

35 Claims, 2 Drawing Sheets

RHODIUM FOAM CATALYST FOR THE PARTIAL OXIDATION OF HYDROCARBONS

CROSS-REFERENCE TO RELATED APPLICATION

The present application claims the benefit of 35 U.S.C. 111(b) provisional application Serial No. 60/199,066, filed Apr. 20, 2000, and entitled "Rhodium Foam Catalyst for the Partial Oxidation of Hydrocarbons.

STATEMENT REGARDING FEDERALLY SPONSORED RESEARCH OR DEVELOPMENT

Not Applicable.

FIELD OF THE INVENTION

The present invention relates to a process for the catalytic partial oxidation of hydrocarbons (e.g., natural gas), and in particular to a process for oxidizing methane to produce a mixture of carbon monoxide and hydrogen using a bulk rhodium catalyst in the form of porous foam or monolith.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is converted into a mixture of carbon monoxide and hydrogen (i.e., synthesis gas or syngas). In a second step, the syngas is converted into hydrocarbons.

Current industrial use of methane as a chemical feedstock proceeds by the initial conversion of methane to carbon monoxide and hydrogen by either steam reforming, which is the most widespread process, or by dry reforming. Steam reforming is currently the major process used commercially for the conversion of methane to synthesis gas, and proceeds according to Equation 1.

$$CH_4 + H_2O \leftrightarrows CO + 3H_2 \qquad (1)$$

Although steam reforming has been practiced for over five decades, efforts to improve the energy efficiency and reduce the capital investment required for this technology continue.

The catalytic partial oxidation of hydrocarbons, e.g., natural gas or methane to syngas is also a process known in the art. While currently limited as an industrial process, partial oxidation has recently attracted much attention due to its significant inherent advantages, such as the fact that significant heat is released during the process, in contrast to steam reforming processes.

In catalytic partial oxidation, natural gas is mixed with air, oxygen-enriched air, or oxygen, and introduced to a catalyst at elevated temperature and pressure. The partial oxidation of methane yields a syngas mixture with a $H_2$:CO ratio of 2:1, as shown in Equation 2.

$$CH_4 + 1/2O_2 \leftrightarrows CO + 2H_2 \qquad (2)$$

This ratio is more useful for the downstream conversion of the syngas to chemicals such as methanol and to fuels than the $H_2$:CO ratio steam reforming. The partial oxidation is also exothermic, while the steam reforming reaction is strongly endothermic. Furthermore, oxidation reactions are typically much faster than reforming reactions. This allows the use of much smaller reactors for catalytic partial oxidation processes.

The selectivities of catalytic partial oxidation to the desired products, carbon monoxide and hydrogen, are controlled by several factors, but one of the most important of these factors is the choice of catalyst structure. For successful operation on a commercial scale, the catalytic partial oxidation process must be able to achieve a high conversion of the methane feedstock at high gas hourly space velocities, while maintaining high selectivity of the process to the desired products of carbon monoxide and hydrogen. Accordingly, there has been an effort to investigate catalysts that provide high selectivity for specified products and have structures that promote partial oxidation of hydrocarbons at high gas hourly space velocities, such as foam monolithic catalysts. Monolithic catalysts, such as foam, have certain advantages as compared to particulate catalysts, such as sponge. These include high reactant throughput, low catalyst cost, reduced reactor size, and ease of replacement.

U.S. Pat. No. 5,648,582 discloses a process for the catalytic partial oxidation of methane in gas phase at very short residence time (a space velocity of 800,000 to 12,000,000 $hr^{-1}$) by contacting a gas stream containing methane and oxygen with a metal supported catalyst, such as platinum, rhodium, or nickel deposited on a monolith. According to the '582 patent, ceramic foam monoliths are preferred where hydrogen production is the desired process use of the synthesis gas. The preferred metals content comprises rhodium or nickel loadings on the monoliths of 1 to 15 percent as applied by washcoats.

European Patent Application EP 0576096 discloses a process for the catalytic partial oxidation of a hydrocarbon feedstock by contacting the feedstock and an oxygen-containing gas with a metal selected from Group VII of the Periodic Table supported on a carrier, in a fixed arrangement having high tortuosity. The fixed arrangement of the catalyst is disclosed to be a fixed bed of a particulate catalyst or a ceramic foam. Rhodium and platinum catalysts on an alpha-alumina support were tested. The rhodium catalyst exhibited a greater intrinsic activity in the catalytic partial oxidation reactions than did the platinum catalyst.

In each of the above-disclosed processes, the catalyst is required to be supported on a carrier. Supported catalysts can be less resistant to thermal shock and may be subject to undesired interactions between the catalytic metal and the material of the carrier. Further, supported catalysts have the disadvantage of hindering reclamation of the catalyst material once the catalyst lifetime has been exceeded, due to the need to separate the metal from the carrier.

In contrast to the teachings that suggest the need for a catalyst support, International Application WO 99/35082 discloses a process for enhancing hydrogen or carbon monoxide production in a partial oxidation reaction by feeding $H_2O$ or $CO_2$ with the feed hydrocarbon and oxygen over a transition metal monolith catalyst such as an unsupported nickel monolith. The metal monolith may be prepared as metal foam or as sintered particles of metal. Nonetheless, it is disclosed that in some applications the metal coated ceramics will be the catalyst of choice. Furthermore, it was found that fresh nickel spheres were more difficult to ignite.

Notwithstanding the foregoing patents and teachings, there remains a need for a process for the partial oxidation of hydrocarbons using an economical unsupported catalyst in a form that is particularly suited to produce synthesis gas with high conversions of methane, with high selectivities to CO and $H_2$, and with high gas throughput.

SUMMARY OF THE INVENTION

The present invention provides a process for the catalytic partial oxidation of a hydrocarbon feedstock by contacting a feed stream comprising the hydrocarbon feedstock and an oxygen-containing gas with a catalyst in a reaction zone maintained at conversion-promoting conditions effective to produce an effluent stream comprising carbon monoxide and hydrogen. The preferred catalyst is an unsupported monolithic catalyst containing rhodium, and is preferably rhodium foam. The preferred foam has a pore content of 75–90% by volume. Further, the preferred foam has a pore size of 20–100 ppi.

The catalyst is preferably pretreated to activate the catalyst by oxidation in air at a temperature of between about 300 and about 1200° C., preferably between about 900 and about 1000° C. Preferably, the air oxidation pretreatment is carried out for a period of time of about one half to four hours.

The preferred catalysts allow effective partial oxidation of the feed gas with high selectivity, together with high methane conversion. CO and $H_2$ selectivities of at least 90% and methane conversion rates of at least 90% can be achieved. Further, the preferred catalysts have long-lived activity, with a half-life of at least six months.

The preferred operating conditions for using the present catalysts include temperatures of about 900° C. to about 1300° C., and more preferably from about 1000° C. to about 1200° C., and pressures of about 110 kPa to about 3000 kPa, and more preferably from about 500 kPa to about 3000 kPa. The feed stream comprising a hydrocarbon feedstock and oxygen gas is preferably preheated to from about 50° C. to about 700° C., and more preferably to about 400° C., before contacting the catalyst. Typical space velocities for the process are from about 60,000 $hr^{-1}$ to about 20,000 $hr^{-1}$, and are preferably from about 150,000 $hr^{-1}$ to about 10,000,000 $hr^{-1}$.

Additionally, a process for the catalytic partial oxidation of a hydrocarbon feedstock is provided comprising: (a) preheating a feed stream comprising a hydrocarbon feedstock and oxygen gas to at least about 350° C.; (b) passing the feed stream over an unsupported rhodium foam catalyst, at a space velocity from about 150,000 to about 10,000,000 NL/kg/h at conversion-promoting conditions comprising a pressure from about 500 kPa to about 2800 kPa wherein the conditions are effective to produce an effluent stream comprising carbon monoxide and hydrogen; wherein the carbon selectivity for carbon monoxide is at least about 80% and the hydrogen selectivity is at least about 60%.

DESCRIPTION OF THE DRAWINGS

For an introduction to the detailed description of the preferred embodiments of the invention, reference will now be made to the accompanying drawings, wherein.

DETAILED DESCRIPTION

Figure 1:
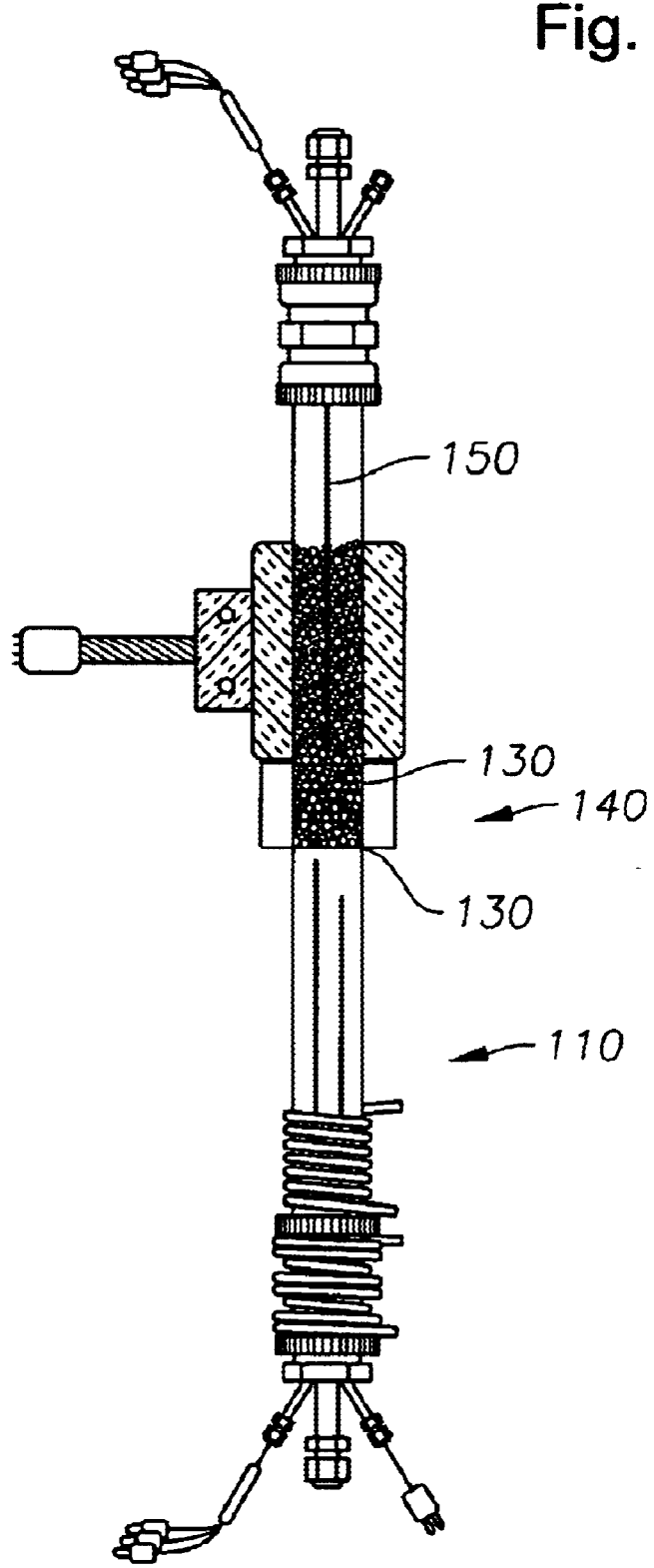
FIG. 1 is a schematic drawing of a quartz reactor suitable for laboratory scale tests of the catalysts of the preferred embodiment.

The present catalyst preferably has a porous monolithic structure. More preferably, the catalyst comprises a foam. The foam porosity preferably varies from about 20 pores per inch (ppi) to about 100 ppi. A rhodium foam disk can be prepared in a similar manner as that of ceramic foams. For example, in one technique an aqueous rhodium suspension is forced into a polyurethane foam disk. The resulting matrix is pyrolyzed in the absence of oxygen to obtain a negative of the original polyurethane foam disk. The rhodium foam disk is then heat treated to obtain the desired catalyst. The foam produced in this manner is essentially monolithic, inasmuch as it is a continuous, albeit porous, self-supporting structure. The foam catalyst is preferably a disk that is sized to fit tightly within the reactor to ensure that the gas feed stream cannot bypass the catalyst. One or more layers of these disks, preferably 1 to about 10 disks, are used as the catalyst. Alternative production methods for metallic foams are described in J. Banhart et al., Mat. Res. Soc. Symp. Vol. 521, 121–132 (1998) hereby incorporated herein by reference. See also Patent GB 1,555,585, hereby incorporated herein by reference. Other suitable methods of preparing foams include evaporation of solvents, atomic injection, ion plating, and electrolysis.

The preferred catalyst includes at least a metal catalytically active for synthesis gas production. Suitable metals include rhodium, platinum, and rhodium in combination with Pt, Ru, Ir, Ni, Au, Pd, Ti, Re, or V. Metallic catalysts can be supported or unsupported. For example, suitable foam supports include $Al_2O_3$, $ZrO_2$, $Y_2O_3$, $Al_2O_3$ that is washcoated, for example with MgO, other forms of $Al_2O_3$, and combinations thereof. The catalyst is preferably unsupported, and a particularly preferred catalyst comprises substantially pure rhodium.

The catalytic process of the present invention can be used to prepare a mixture of carbon monoxide and hydrogen from any gaseous hydrocarbon having a low boiling point. The hydrocarbon feedstock is in the gaseous phase when contacting the catalyst. The present catalysts are suitable for the partial oxidation of methane, natural gas, associated gas or other sources of light hydrocarbons having 1 to 5 carbon atoms. Natural gas is mostly methane, but it can also contain up to about 15 mole % ethane, propane and butane. The process may be used for the conversion of gas from naturally occurring reserves of methane, which can also contain carbon dioxide, nitrogen and hydrogen sulfide. Preferably, the feed comprises at least 50% by volume methane, more preferably at least 75% by volume, most preferably at least 80% by volume.

The hydrocarbon feedstock is preferably contacted with the present catalyst in a reaction zone as a mixture with an oxygen-containing gas, preferably pure oxygen. The methane-containing feed and the oxygen-containing gas are mixed in such amounts to give a carbon (ie., carbon in methane) to oxygen ratio from about 1.25:1 to about 3.3:1, more preferably, from about 1.3:1 to about 2.3:1, and most preferably from about 1.5:1 to about 2.2:1.

The syngas generation can take place at atmospheric or superatmospheric pressures, with the latter being preferred. For example, the process can be operated at pressures of from about 110 kPa to about 3000 kPa, preferably from about 500 kPa to about 3000 kPa.

The present catalysts are preferably operated at temperatures of from about 800° C. to about 1300° C., preferably from about 900° C. to about 1200° C. The hydrocarbon feedstock and the oxygen-containing gas are preferably pre-heated to between about 50° C. and about 700° C., and preferably to about 300–500° C., before contacting the catalyst.

The hydrocarbon feedstock and the oxygen-containing gas can be passed over the catalyst at a variety of space velocities. Typical space velocities for the process, stated as normal liters of gas per kilogram of catalyst per hour, are from about 60,000 to about 20,000,000 $hr^{-1}$, preferably from about 150,000 to about 10,000,000 $hr^{-1}$.

Preferably the catalyst is pretreated by oxidation in air. Preferably the oxidation conditions include a temperature between about 300 and about 1200° C., preferably between about 900 and about 1000° C. Further, the exposure of the catalyst to air preferably proceeds for a duration of time of about one half to four hours.

EXAMPLES

Referring now to FIG. 1, a reactor 110 suitable for laboratory investigation of the catalyst of the preferred embodiments is shown in schematic. This reactor resembles in shape a reactor suitable for industrial catalysis, but is scaled down in size. A reactor constructed in this manner was used to perform the examples set out below. The partial oxidation reactions were done with a 19 mm O.D.×13 mm I.D. quartz reactor containing five rhodium foam disks (1 mm×12 mm O.D. and about 100 ppi) 120 held between two 5 mm×12 mm and 40 ppi alpha-alumina foam disks 130, which served as radiation shields. The inlet radiation shield also aids in uniform distribution of the feed gases. The gauze and the disks were wrapped with an alumina cloth to obtain a single cylinder 140 of 13 mm diameter and about 15 mm height (approximately 5 mm catalyst thickness and 10 mm radiation shields). The catalyst was tightly forced inside the reactor to minimize gas by-pass. A band heater was fitted around the quartz reactor. The band heater was used to supply thermal energy to light off the reaction and to preheat the feed gases. After light off, no heating was provided to the reaction zone. Thus, the reaction proceeded autothermally. Two Type S thermocouples 150, one at each end of the gauze stack, were used to monitor the reaction temperature.

Figure 2:
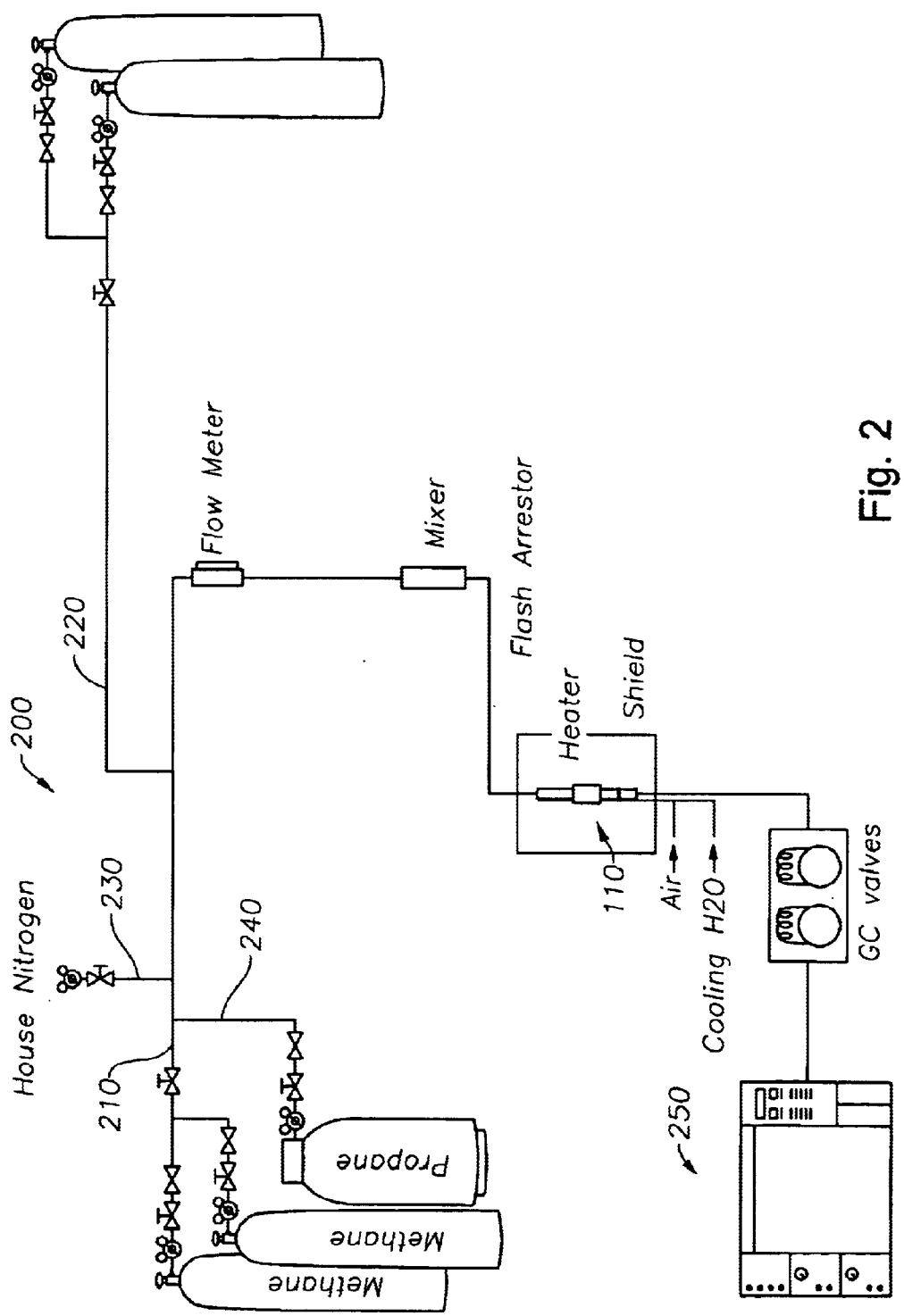
FIG. 2 is a schematic drawing of the bench scale catalyst testing unit for the catalysts of the preferred embodiment.

To carry out tests on the novel catalysts, a system such as that shown in FIG. 2 was assembled. Specifically a laboratory bench scale syngas unit 200 included a gas supply system. Syngas unit 200 is illustrated in FIG. 7 for methane as the fuel. Alternatively, syngas unit 200 and the gas supply system are adapted to use a simulated natural gas mixture as the fuel. Referring again to FIG. 7, the gas supply system includes a methane supply line 210, an oxygen supply line 220, and a nitrogen supply line 230. Methane supply line 210 has a propane tie-in 240. The propane tie-in is preferably used for starting up the syngas reaction because the ignition temperature of a propane/air flame is lower than that of a methane/air flame. Nitrogen is added at about 5% by volume as an inert tracer component. Unit 200 is controlled by a computer (not shown), for example by a Texas Instruments Model 545 PLC system interfaced to a PC using a Wonderware Human-Machine Interface Program. The methane and oxygen gases are mixed together at room temperature and the mixed gas fed to reactor 110 with or without preheating. The reaction takes place at 4 psig, for example, and on the catalyst surface. Product gas mixtures may be analyzed for methane, oxygen, carbon monoxide, hydrogen, carbon dioxide, and nitrogen, using any known analysis equipment. This system was used to test the catalysts of the following examples. The methane-containing and oxygen gases were mixed at room temperature and the mixed gas was fed to the reactor with or without preheating. The product gas mixture was analyzed for $CH_4$, $O_2$, CO, $H_2$, $CO_2$ and $N_2$ using a gas chromatograph 250 equipped with a thermal conductivity detector. Methane fuel is intended to be exemplary of fuels suitable for synthesis gas production, such as light hydrocarbons, natural gas, associated gas, and the like.

Examples 1–10

The results of partial oxidation reactions at a variety of conditions are shown in Table 1. The oxygen conversion was 99 to 100% in all the examples 1–10. In a life study test the catalyst maintained activity for 73 days of testing. Based on the results obtained in the bench scale tests it is believed that the present rhodium foam catalyst can be used for one-half to 2 years, depending on the operating conditions. One measure of the lifetime is the half-life, which is the duration of time over which the catalytic activity, such as molar % methane conversion, decreases by one-half from its initial value. Follow-up tests in a 2-inch diameter pilot partial oxidation unit showed that the rhodium foam catalyst has similar performance at elevated pressures of up to about 800 kPa. Catalytic activity at such higher pressures is desirable for a synthesis gas production process that is coupled to a Fischer Tropsch process of hydrocarbon production such that the synthesis gas produced forms the feed stream for the Fischer-Tropsch process.

TABLE 1

Catalyst = five rhodium foam disks (1 mm × 12 mm O.D. and about 100 ppi) between two 5 mm × 12 mm and 40 ppi alpha-alumina foam disks
Fuel = methane

| EX. | Pressure (psig) | (kPa) | Temp (° C.) Pre-H | Cat-T | Cat-B | GHSV ($hr^{-1}$) | $CH_4$:$O_2$ Ratio | % CO Sel. | % $H_2$ Sel. | % $CH_4$ Conv. | $H_2$:CO Ratio |
|---|---|---|---|---|---|---|---|---|---|---|---|
| 1 | 3 | 122 | 440 | 577 | 1022 | 440,000 | 2.20 | 97 | 93 | 74 | 1.91 |
| 2 | 3 | 122 | 443 | 588 | 1050 | 460,000 | 1.97 | 97 | 93 | 85 | 1.90 |
| 3 | 3 | 122 | 443 | 599 | 1119 | 480,000 | 1.74 | 97 | 93 | 95 | 1.92 |
| 4 | 3 | 122 | 460 | 617 | 1127 | 480,000 | 1.74 | 97 | 92 | 95 | 1.91 |
| 5 | 4 | 129 | 360 | 504 | 1177 | 770,000 | 1.74 | 94 | 90 | 92 | 1.91 |
| 6 | 4 | 129 | 340 | 478 | 1139 | 810,000 | 1.74 | 98 | 92 | 91 | 1.87 |
| 7 | 1 | 101 | 462 | 613 | 944 | 220,000 | 1.98 | 97 | 89 | 81 | 1.89 |
| 8 | 2 | 115 | 459 | 612 | 971 | 230,000 | 1.78 | 96 | 93 | 92 | 1.94 |
| 9 | 6 | 143 | 314 | 418 | 1054 | 900,000 | 2.03 | 98 | 94 | 78 | 1.91 |
| 10 | 7 | 150 | 316 | 421 | 1074 | 920,000 | 1.92 | 97 | 94 | 84 | 1.93 |

In the present discussion, rhodium foam is intended to be exemplary of an unsupported porous monolithic catalyst containing rhodium. For example, other Group VIII metals may be included with the rhodium in amounts that do not hinder the catalytic activity. Without further elaboration, it is believed that one skilled in the art can, using the description herein, utilize the present invention to its fullest extent. The foregoing embodiments are to be construed as illustrative, and not as constraining the remainder of the disclosure in any way whatsoever.

While preferred embodiments of this invention have been shown and described, modifications thereof can be made by one skilled in the art without departing from the spirit or teaching of this invention. The embodiments described herein are exemplary only and are not limiting. Many variations and modifications of the process and catalyst are possible and are within the scope of the invention. Accordingly, the scope of protection is not limited to the embodiments described herein, but is only limited by the claims which follow, the scope of which shall include all equivalents of the subject matter of the claims.

We claim:

1. A process for the catalytic partial oxidation of a hydrocarbon feedstock comprising:

contacting a feed stream comprising a hydrocarbon feedstock and an oxygen-containing gas feed stream with a monolithic porous metal foam catalyst at conversion-promoting conditions effective to produce an effluent stream comprising carbon monoxide and hydrogen, wherein the monolithic porous metal foam comprises rhodium and has 75–90% by volume pores and 20–100 pores per inch pore size.

2. The process of claim 1 wherein the catalyst further comprises platinum.

3. The process of claim 1 wherein the catalyst is pretreated by exposure to air under conditions sufficient to oxidize the catalyst.

4. The process of claim 1, further comprising preheating said feed stream to a temperature of at least about 30° C.

5. The process of claim 4 wherein the feed stream is preheated to a temperature between about 50° C. and about 700° C.

6. The process of claim 5 wherein the feed stream is preheated to about 400° C.

7. The process of claim 1 wherein maintaining the reaction zone further comprises maintaining pressure in said reaction zone between about 500 kPa and about 2800 kPa.

8. The process of claim 1 wherein the molar ratio of methane to oxygen is from about 1.5:1 to about 2.2:1.

9. The process of claim 1 wherein the hydrocarbon feedstock comprises at least about 50% by volume of methane.

10. The process of claim 1 wherein the carbon selectivity for carbon monoxide is at least about 80%.

11. The process of claim 1 wherein the hydrogen selectivity is at least about 60%.

12. The process of claim 1 wherein contacting the feed stream with the catalyst passing the feed stream over the catalyst at a space velocity from about 150,000 to about 10,000,000 NL/kg/h.

13. The process of claim 1 comprising maintaining catalyst activity for at least 73 days of operation.

14. The process of claim 13 comprising using said catalyst for 6 months to 2 years.

15. A process for the catalytic partial oxidation of a hydrocarbon feedstock, comprising:

contacting a feed stream comprising a hydrocarbon feedstock and an oxygen-containing gas feed stream with a monolithic porous metal foam catalyst at conversion-promoting conditions effective to produce an effluent stream comprising carbon monoxide and hydrogen;

wherein the monolithic metal foam comprises unsupported rhodium, 75–90% by volume pores and 20–100 ppi pose size, and the carbon selectivity for carbon monoxide is at least about 80% and the selectivity for hydrogen is at least about 60%.

16. The process of claim 15 wherein the hydrocarbon feedstock comprises at least about 50% methane by volume.

17. The process of claim 15 wherein the catalyst further comprises platinum.

18. The process of claim 15 wherein the catalyst is pretreated by exposure to air under conditions sufficient to oxidize the catalyst.

19. The process of claim 15 further comprising preheating said feed stream to a temperature of at least about 30° C.

20. The process of claim 19 wherein the feed stream is preheated to a temperature between about 50° C. and about 700° C.

21. The process of claim 20 wherein the feed stream is preheated to about 400° C.

22. The process of claim 15 wherein said contacting in carried out at a pressure between about 500 kPa and about 2800 kPa.

23. The process of claim 15 wherein the hydrocarbon feedstock contains methane and the molar ratio of methane to oxygen is from about 1.5:1 to about 2.2:1.

24. The process of claim 15 wherein the hydrocarbon feedstock comprises at least about 50% by volume of methane.

25. The process of claim 15 wherein contacting the feed stream with the catalyst comprises passing the feed stream over the catalyst at a space velocity from about 150,000 to about 10,000,000 NL/kg/h.

26. A process for the catalytic partial oxidation of a hydrocarbon feedstock comprising:

(a) preheating a feed stream comprising a hydrocarbon feedstock and oxygen gas to a temperature between 50° C. and 700° C;

(b) passing the feed stream over a catalyst bed comprising a plurality of rhodium metal foam disks, at a space velocity from about 150,000 to about 10,000,000 NL/kg/h at conversion-promoting conditions comprising a pressure from about 500 kPa to about 2800 kPa wherein the conditions are effective to produce an effluent stream comprising carbon monoxide and hydrogen;

wherein the carbon selectivity for carbon monoxide is at least about 80% and the hydrogen selectivity is at least about 60% and wherein each said foam disk has 75–90% by volume pores and 20–100 ppi pore size.

27. The process of claim 26 wherein the hydrocarbon feedstock comprises at least about 50% methane by volume.

28. The process of claim 26, further including pretreating the catalyst by exposure to air under conditions sufficient to oxidize the catalyst.

29. The process of claim 26 wherein the feed stream is preheated to about 400° C.

30. The process of claim 26 wherein the hydrocarbon feedstock contains methane and the molar ratio of methane to oxygen is from about 1.5:1 to about 2.2:1.

31. The process of claim 26 wherein said plurality of disks comprises up to 10 disks.

32. A catalyst for the partial oxidation of a hydrocarbon feedstock, comprising a porous rhodium foam monolith comprising 75–90% by volume pores and 20–100 ppi pore size;

wherein the catalyst is capable of oxidizing the hydrocarbon feedstock with a hydrogen selectivity of at least about 60%.

33. The catalyst of claim 32 wherein the foam has been pretreated by exposure to air under conditions sufficient to oxidize the rhodium.

34. The catalyst of claim 32 prepared by a method comprising impregnating a polyurethane foam disk with an aqueous rhodium suspension, pyrolyzing the polyurethane to provide a rhodium negative of the polyurethane foam, and heat treating the rhodium negative.

35. The catalyst of claim 32 further comprising platinum.

* * * * *